(No Model.)  
3 Sheets—Sheet 1.

H. H. NIEBUR.
BALLOT BOX.

No. 518,351. Patented Apr. 17, 1894.

Witnesses  
Inventor  
Henry H. Niebur  
John Wedderburn  
his Attorney

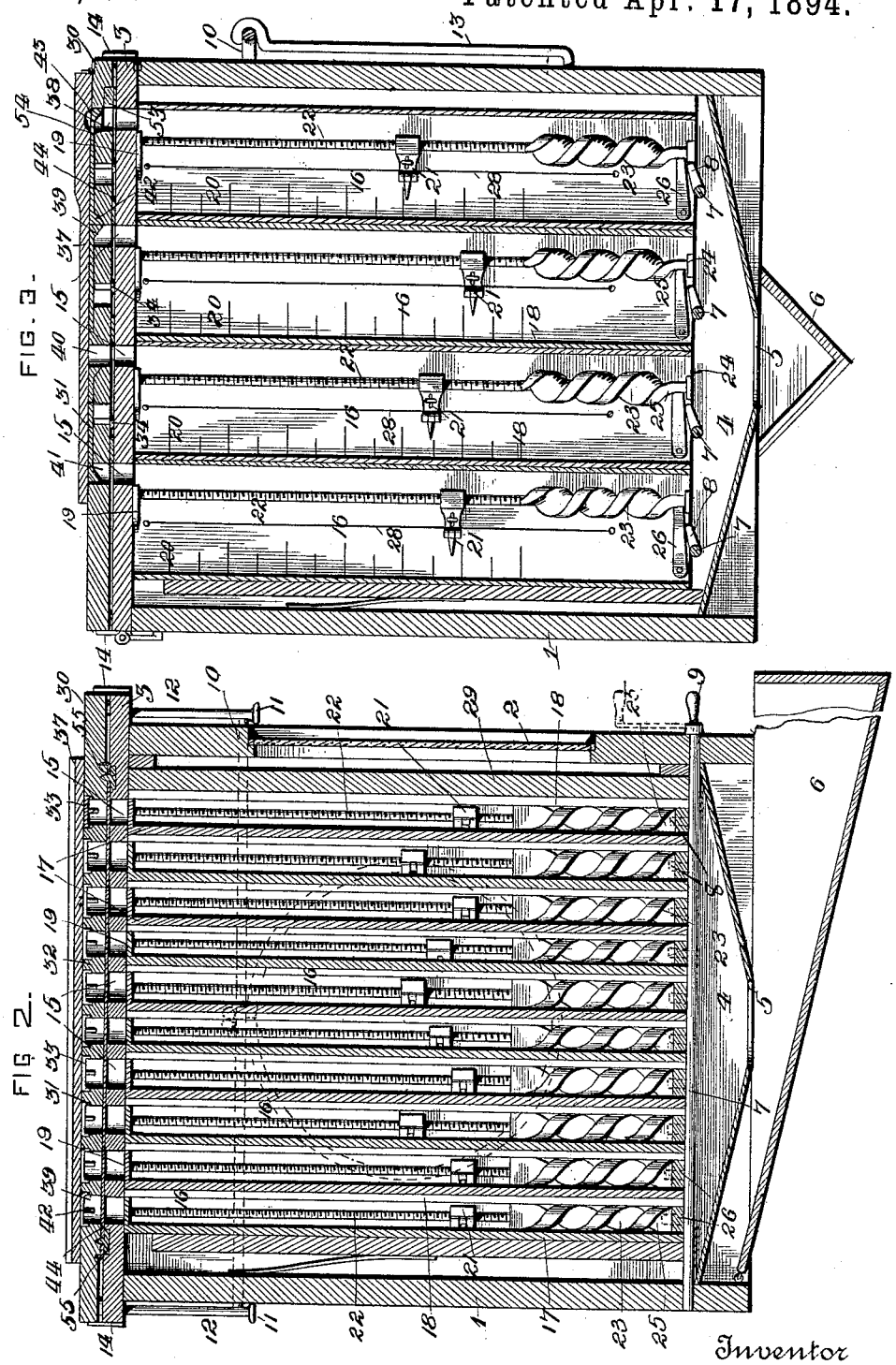

(No Model.) 3 Sheets—Sheet 3.
H. H. NIEBUR.
BALLOT BOX.
No. 518,351. Patented Apr. 17, 1894.
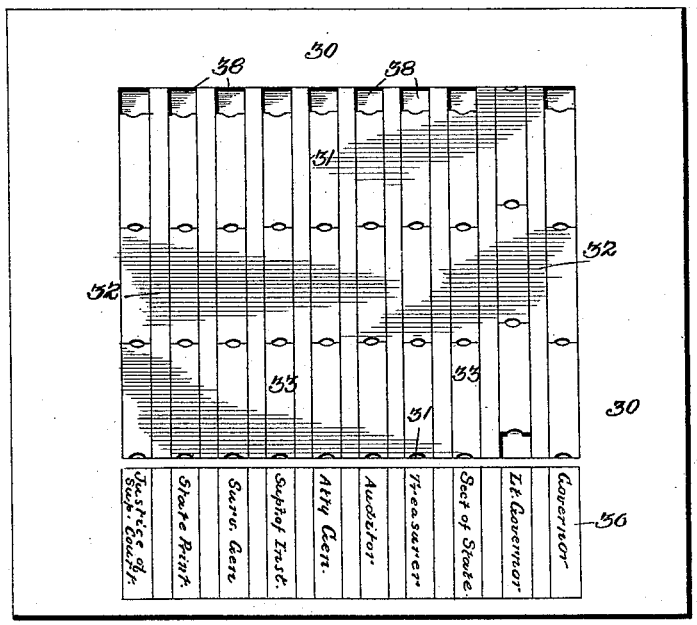
FIG. 4.
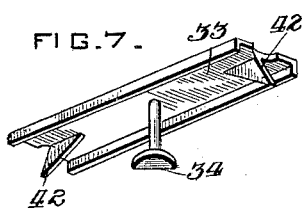
FIG. 6.
FIG. 5.
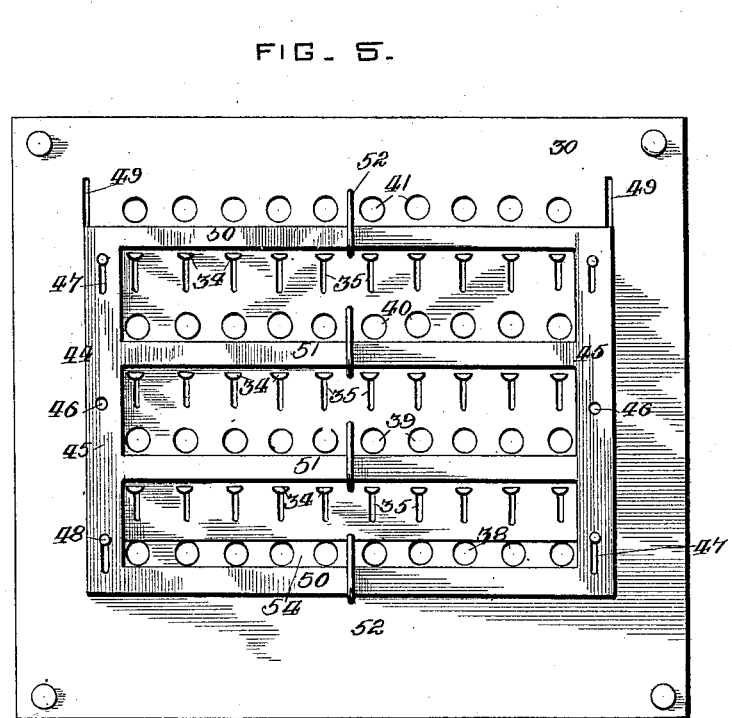
FIG. 7.
Witnesses
Inventor
Henry H. Niebur
By John Wedderburn
his Attorney

UNITED STATES PATENT OFFICE.

HENRY H. NIEBUR, OF FERNDALE, CALIFORNIA.

BALLOT-BOX.

SPECIFICATION forming part of Letters Patent No. 518,351, dated April 17, 1894.

Application filed June 17, 1893. Serial No. 477,969. (No model.)

*To all whom it may concern:*

Be it known that I, HENRY H. NIEBUR, a citizen of the United States, and a resident of Ferndale, in the county of Humboldt and State of California, have invented certain new and useful Improvements in Ballot-Boxes; and I do hereby declare the following to be a full, clear, and exact description of the invention, such as will enable others skilled in the art to which it appertains to make and use the same.

This invention relates to ballot-boxes, and has for its object to produce a safe and accurately registering device of the character set forth, of simple and effective construction and operation, wherein all the ballots for all candidates to be voted for are simultaneously deposited, and delivered to passage-ways which register or tally each vote as it is cast.

The invention primarily consists of an outer box or receptacle having a series of compartments and separate passage-ways, and a removable tray or series of trays simulating a ticket and wherein ball ballots are placed by the voter and concealed from view, each tray being arranged by the person voting within a secluded place and handed back to the proper inspector of elections who places it over the ballot box proper and delivers the ball ballots from the tray.

The invention further consists of suitable recording mechanism in each compartment which is adapted to operate to tally each vote as it is cast and after the election is closed show a complete record of all the votes cast, thereby making it easy to count the total number of votes and dispensing with the labor, time and expense, which are now usually employed in making out the record of votes in each precinct, and requiring a less number of inspectors and judges of election at each poll or voting place.

The invention also consists of the construction and arrangement of the parts which will be more fully hereinafter described and claimed.

Figure 6:
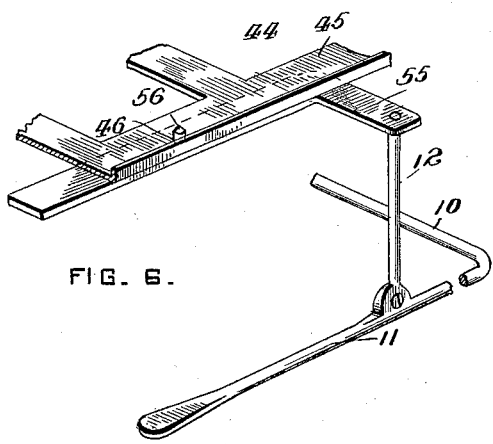
Figure 1:
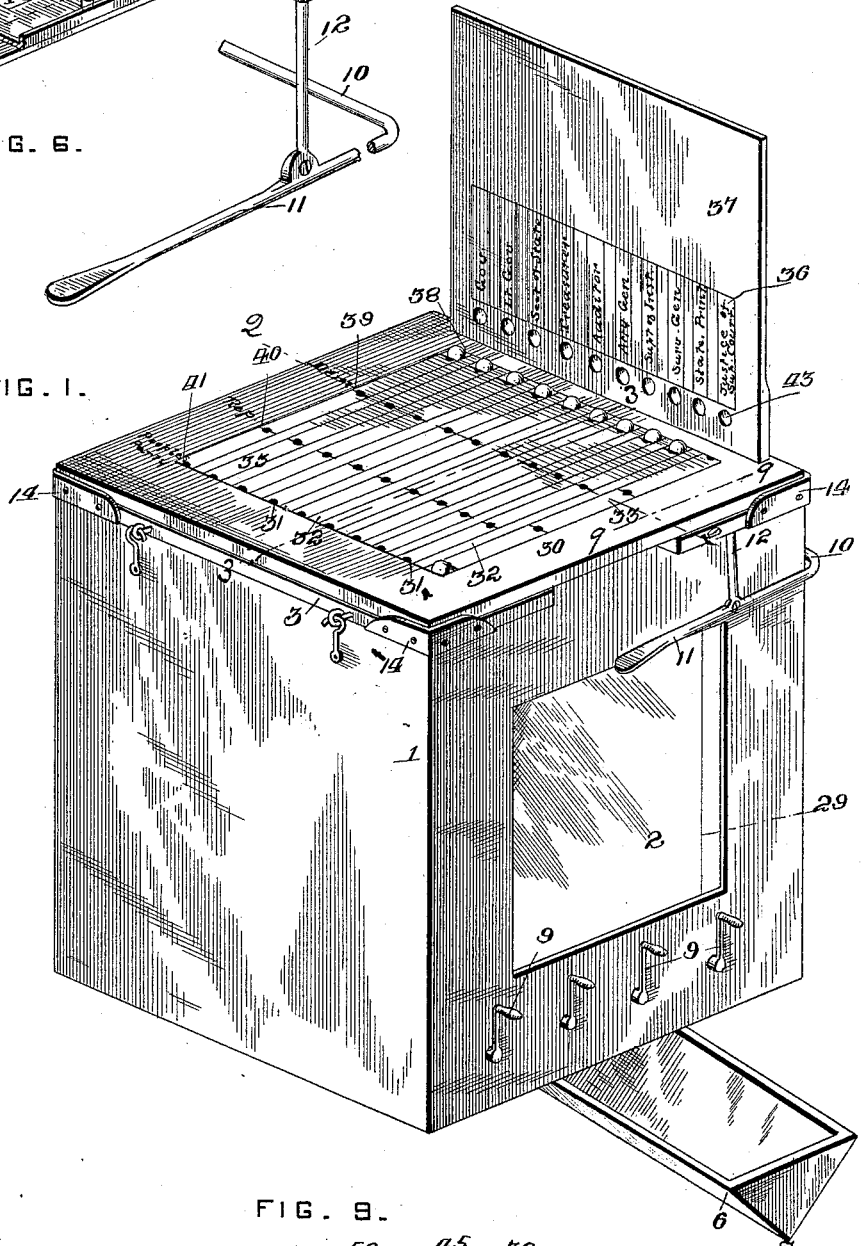
Figure 9:
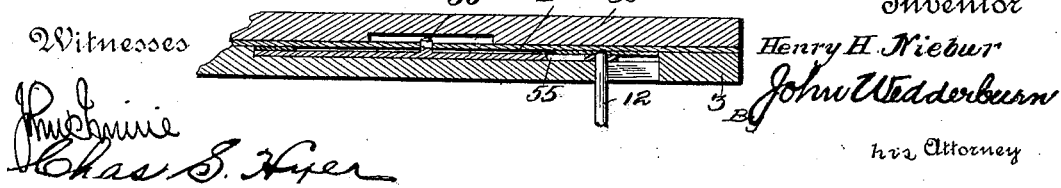

In the drawings: Figure 1 is a perspective view of a ballot-box embodying the invention and showing the voting tray in position and uncovered. Fig. 2 is a longitudinal section on the line 2—2 Fig. 1. Fig. 3 is a transverse section on the line 3—3 Fig. 1. Fig. 4 is a top plan view of the voting tray which formed a combined ticket. Fig. 5 is a bottom plan view of said tray. Fig. 6 is a detail perspective view of a part of the mechanism for operating said tray. Fig. 7 is a detail perspective view of one of the tray slides detached. Fig. 8 is a sectional view of a portion of one of the compartments showing a different form of registering mechanism. Fig. 9 is a sectional view of one edge of the tray and a part of the box and the operating lever therefor on line 9—9 Fig. 1.

Similar numerals of reference are employed to indicate corresponding parts in the several figures of the drawings.

Referring to the drawings, the numeral 1 designates an outer box or casing of the ballot-box proper which may be of any preferred size, shape and material, and having at one end thereof a sight-glass or opening 2. To the upper part of the said box or casing 1 is hingedly connected a lid or cover 3 which is adapted to be locked down upon the box or casing by suitable means to prevent entrance to the ballot-box proper until opened by the proper person having authority to do so. The bottom of the box or casing is made hopper shaped as at 4 with a central opening 5 and under the said opening is mounted a trough or chute 6 having an inclined bottom and which is closed at one end and open at the opposite end. Above the hopper-shaped bottom are a series of longitudinally disposed parallel shafts 7 having a series of crank-arms 8 thereon arranged at predetermined intervals, and the ends of the said shafts project through the box or casing proper under the sight-opening, and are provided with operating cranks or handles 9, whose position will indicate the position of the crank-arms 8. The upper part of the back of the box or casing has an operating lever 10 mounted thereon with angularly bent ends 11 which are pivoted against the sides of the box and form operating handles. From the pivotal point of said handles rise vertical arms 12 and that part of the lever 10 which extends across the back of the box is preferably engaged by springs 13 which normally hold the handles 11 and the lever 10 in the position shown in Figs. 1 and 6. The upper corner of each angle of the box is supplied with an angular keeper or guide 14 which projects above the lid or cover 3, and the latter is formed with a series of holes or openings 15 which extend across the same and are employed for a purpose which will be presently described.

Within the box or casing are mounted a series of compartments 16 of any preferred dimension and having closed backs 17 from which extend side flanges 18. The said compartments are open at the top and bottom except where supports 19 extend outward from the top of the same for the connection of the operating mechanism within each compartment. The upper edges or top ends of the compartments are each supplied with an identifying name, number, letter, cipher or other symbol so that their position may be readily determined or arranged consecutively, or to correspond with the voting mechanism above and thereby avoid mistakes and error after the said compartments are removed from the casing or box. The upper end of each compartment aligns with one of the holes or openings 15 in the lid or cover 3, it being seen by reference to Fig. 3 of the drawings that the said holes or openings 15 are positioned over the right side.

Within each compartment adjacent to the left side of the same is arranged a scale 20 which increases in notation from the bottom to the top and in connection with this scale is employed an index hand 21 which is removably mounted on a vertical screw-threaded shaft 22 having its upper end movably mounted in the support 19 and its lower end connected to or integrally formed with an enlarged metallic spiral 23 whose lower end is freely and rotatably mounted in a step or projection 24. The lower end of the said spiral is slightly flattened or constructed in a straight line as at 25 and therewith is adapted to engage a gravitating pawl or locking-dog 26 which is adapted to be engaged by one of the crank arms 8 on one of the shafts 7 when the said compartment is placed within the casing or box to thereby unlock the spiral 23 for operation, or after the said compartment is removed to lock the said spiral against operation.

Over the index-hand 21 is loosely mounted a guide or retaining cord or analogous device 28 to hold the said index-hand closely to the scale.

As many of the compartments as are desired to be used are placed within the box or casing in consecutive order and under the holes or openings 15 in the lid or cover 3. When the compartments have been thus arranged the sight-opening 2 is closed by inserting a removable slide or shutter 29 which shuts off the view to the adjacent compartments and no one will have a knowledge of the number of ballots which have been cast for each candidate until such proper designated time when the said compartments are removed and examined by the proper person.

In operation the ball-ballots which pass through the holes or openings 15 fall down into the right side of each compartment which is in use and strike the spiral 23, being of such weight as to revolve the latter a sufficient distance to once rotate the vertical screw shaft and actuate the index-hand to register one vote. The ball-ballot then passes out through the bottom of the compartment and strikes the hopper-shaped bottom 4 of the casing or box, passes through the central opening 5 thereof and into the trough 6 and is again carried to an accessible position to be reached by those having proper authority. It will be seen that as the successive ballots are cast by the voters they will be registered in the several compartments and after the voting has ceased the sum total of the number of votes cast for each candidate which the several compartments represent may be readily taken down or tallied upon a suitable record sheet by merely looking at the number indicated by each index-hand.

Of course the mechanism as thus far described forms a complete and practicable operating machine without the addition of any other parts but it is preferred and intended that a tray or number of trays 30 shall be used in connection therewith and which represent or simulate a ballot or ticket bearing the names of the candidates and the parties to which they belong and represent. The number of these trays in use with each ballot-box will be proportionate to the total number of voters within a precinct and their size will depend upon the total number of candidates in each election for which they are used. The upper face of each tray is formed with a series of grooves 31 intersected by a series of transverse ribs 32 which separate the grooves from each other and in the said grooves are mounted a series of slides 33 which are freely movable in the said grooves but are held from falling out from the same by headed studs or pins 34 which coact with slots 35 in the tray and thereby always hold the said slides in proper position. As shown in the accompanying drawings a series of three slides 33 are placed within each groove 31 and said grooves are in line with names of offices on an adjacently printed or indicating slip or plate 36 which as shown in Fig. 1 is supported on a suitable hinged lid or cover 37 which is adapted to be brought to bear on the top of said tray or as shown in Fig. 4 the said indicating strip or plate may be placed at the foot or opposite side of the series of grooves. At the head of the grooves are formed a series of openings 38 and between each pair of slides 33 when properly moved, and the rear termination or foot of each groove are openings 39, 40, and 41. It will be observed that owing to the length of each slide, which will be predetermined, that only one of the openings in each groove can be employed or used at a single time and that for this reason it will be impossible to vote for more than one candidate for the same office. The names of the offices are arranged as stated in a general election, but this is subject to change to arrange the ballot-box for use with any local or county election or for use in societies and general business purposes.

To avoid confusion in a State or national election or in fact any election of whatsoever nature may be desired to be carried on, the openings 39 extend in longitudinal alignment lengthwise of the tray and form the ticket entire of one faction or party so that a voter placing his ball-ballots within this row of openings 39 will vote, for example, the entire Democratic ticket. The row of openings 40 are similarly arranged and designate, for instance, the Republican party, and when a voter has placed his ball-ballots therein he designates and completes the casting of his vote for the entire Republican ticket, the row of openings 41 constitute or represent the ticket of another faction or party and this system may be continued indefinitely, as will be readily understood. The row of openings 38 are employed to place the ball-ballots in when the tray is handed to the voter, and if the ballots from this row of openings 38 are not all employed by the voter they are left in position as originally handed to him. Of course it is readily possible for a voter to cast a ballot for a Republican in one office, a Democrat in another office, or a People's party in another office, and so on, interchange his votes as he may see fit, but he cannot cast but one ballot in each office. When the ballots are placed within the holes or openings 39, 40, or 41, the slides 33 must be moved to make room for the reception of the said ball-ballot and the parts are so proportioned that the ball-ballot in position in each groove locks the slides against further adjustment and thereby prevents the insertion of more than one ball in each groove and obviates duplicate voting. This is facilitated by projections 42 at opposite ends of each slide which strike opposite sides of the ball when in either of the openings 39, 40, or 41 and prevent the said slides from being pushed over the balls it being understood that the said openings 39, 40 or 41 are of such depth as to entirely receive the ball and leave no surface projection thereof above the level of the slides. The row of openings 38 are of less depth than the other openings in order that the balls originally placed therein may project sufficiently above the surface of the tray as to be readily lifted and grasped by the voter to be properly placed as he may desire and the lid or cover 37 at the proper point is supplied with a series of recesses or cavities 43 which fit over the balls when placed in the row of openings 38 and thereby cover the same.

To the under side of the tray is attached a sliding-frame 44 Figs. 5 and 6 consisting of opposite end strips 45 having openings 46 therein, one in each, said end strips being formed with slots 47 adjacent to their opposite ends which are engaged by the inner ends of elongated staples or guides 48. A portion of said end strips 45 cover grooves 49 in the under side of the tray and said strips are connected by outer longitudinally disposed bars of a similar thickness as at 50 and intermediate bars 51, said bars acting to open and close the rows of openings 38, 39, 40 and 41 and over the central portion of the said bars are mounted guide staples or keepers 52. The entire slide-frame 44 operates at one and the same time, and the bar 50 nearest the hinged cover or lid for the tray has attached thereto an upper bar 53 Fig. 3 moving in an under longitudinal groove 54, directly under the series of openings 38 which is constructed for the purpose of making the said openings of less depth than the remaining rows of openings in order to elevate the balls to readily grasp the same, as previously stated.

When a voter approaches a poll for the purpose of voting, the clerk of election hands him one of the trays having the balls properly positioned in the row of openings 38 and the hinged lid or cover down in position thereover. The voter then steps into or secludes himself in the booth and after arranging his ball ballots in the rows of openings representing the party or faction and candidates for the several offices, he closes down the cover or lid 37 and hands the tray to the inspector of election. The inspector then places the said tray on the top surface of the lid or cover 3 of the box or casing 1 with the corners of the said tray snugly fitting in the keepers or corner-plates 14. The upper ends of the arms 12 pass through the adjacent edges or ends of the lid or cover 3 and engage the outer ends of L-shaped slides 55 having studs or pins 56 rising therefrom which engage the openings 46 in the end strips 45 of the slide 44, it being understood that all the openings of the said tray are closed when handed to the voter and remain closed until placed upon the top surface of the cover or lid 3. Even after the tray is placed upon the top of the cover or lid 3, the rows of openings in the said tray remain closed until the handles 11 of the lever 10 are pressed downwardly, the L-shaped slides 55 moved backwardly thereby and the studs or pins 56 draw backward on the slide 44 and open all the rows of holes and permit the ballot in the form of the balls to pass downwardly through the holes 15 in the lid or cover 3, the said holes 15 being in alignment with the rows of holes in the tray. After the ball-ballots pass through the holes or openings 15 they fall into the compartments as previously described and are delivered from the bottom of the box into the trough 6. By this operation it will be seen that all the balls originally placed in the tray will be delivered into the trough 6 even though some of the said balls may not have been used in casting a vote but allowed to remain idle in some of the openings 38 at the will of the voter and all balls are caused to pass through the several compartments. Those balls which are not employed in voting but remain in the openings 38 pass downwardly through compartments which represent non-voting compartments and are registered similar to the balls passing through the other compartments which are located under the names of the candidates. The balls will all be delivered into the trough 6 unless they are maliciously tampered with by the application of some adhesive substance and if this should take place the ball will stick in the spiral of the registering mechanism and it will be made known to the inspector of election immediately by detecting the absence of the ball in the trough 6. It is the intention to have the slides 33 supplied with the names of the candidates on the upper exposed surfaces thereof and in applying the same various means may be employed, such as pasting slips of paper bearing the names directly on the top of the slide or be removably held in place by clips or bendable flanges, all of which operations are well known in the several arts.

The compartments will be of proper size and dimensions and may be readily constructed from papier maché or compressed pulp of a suitable nature and of any desirable length. Said compartments will be placed snugly within said box or casing, and held in upright positions. If so desired they may be joined or coupled in series representing the candidates of different parties or factions for one office so that they may be the more readily removed and the operation of tallying the number of votes registered for each candidate greatly facilitated, the lid or cover 37 may be of suitable material and of suitable size relatively to the top of the tray.

Other changes can be made from time to time within the scope of the invention and substituted at such points as may be found desirable and among others may be noted the change of the registering mechanism as shown in Fig. 8. In this instance the lower end of each compartment is provided with a pivoted dog 57 whose beveled end is situated under a passage-way 58 through which drops the ballot-ball and strikes the said end of the dog. To the inner end of the said dog is secured a vertical ratchet bar 59 which is engaged by the feeding-finger 60 of a slide 61 which carries a stop-finger 62 engaging the ratchet teeth on a guide bar 63 upon which the said slide is movably mounted. The said slide carries an index-hand 64 which plays over a scale similar to the construction heretofore set forth and registers each vote as successively cast. After the ballots have been delivered to the compartments in the ballot-box by the inspector of election, he then removes the tray from the top surface of the lid or cover 3 and strikes the same a sharp blow upon the outer edge to reset the slides and close the openings which have been used by the voter and open all of the openings 38, which operation is performed before the lid or cover 37 is raised, thereby making it absolutely secret as to the manner in which the voter casts his ballot.

The ballot-box as thus described is extremely simple in view of the convenience and accuracy of operation, and the voter with a very small amount of education can readily learn the same without mistake or error.

Another change which would readily suggest itself would be to reverse the threads of the screw shaft of the registering mechanism, so that the index-hand would work downwardly, instead of moving upwardly.

Having thus described the invention, what is claimed as new is—

1. A ballot-box having a series of compartments therein, a removable tray or series thereof having holes or openings therein coincident with said compartments and adapted to receive ball-ballots, and means for releasing said ball-ballots, substantially as described.

2. A ballot-box having a series of removable compartments with passage-ways therethrough, a removable tray or series thereof having holes or openings therein coincident with said passage-ways for receiving ball-ballots, means for releasing said ball-ballots, and means for registering votes as cast, substantially as described.

3. A ballot-box having a series of compartments with passage-ways therethrough, a removable tray having holes or openings therein corresponding to said passage-ways and designed to receive ball-ballots and a movable frame beneath said holes or openings, substantially as described.

4. A ballot-box having a series of compartments with passage-ways therethrough, a removable tray having holes or openings therein corresponding to said passage-ways, a movable frame beneath said holes or openings and a lever fulcrumed on said ballot-box and designed to operate said frame, substantially as described.

5. The combination with a ballot-box having a series of compartments and passage-ways therethrough, of a tray having holes or openings corresponding to said passage-ways, a frame loosely attached to said tray and having cross-bars beneath said holes or openings, and a spring pressed lever fulcrumed on said box and having arms engaging said frame, substantially as described.

6. The combination with a ballot-box having a series of separate passage-ways, of a tray having a series of holes or openings, slides between corresponding holes or openings, and a movable frame beneath said holes or openings of said tray, substantially as described.

7. The combination of the box having separate passage-ways provided with inclined bottoms and discharge holes at the ends thereof, the tray having holes or openings corresponding to said passage ways, slides having cross-bars normally held beneath said holes or openings, and means for operating the same, substantially as described.

8. A ballot-box having a removable compartment supplied with a passage-way therethrough, a vertical screw-shaft therein with a lower spiral of increased dimension, a scale, and an index-hand adjustably mounted on said vertical screw-shaft, said spiral being engaged and operated by a ball ballot, substantially as described.

9. In a ballot box the combination of a compartment having a passage-way therethrough for the reception of a ball-ballot, a registering mechanism comprising a lower spiral having a straight portion at the lower end thereof and a lock engaging the said lower straight portion of the said spiral, substantially as described.

10. A removable tray having a series of openings therein and a box upon which said tray is adapted to be placed having a series of removable compartments with passage-ways therethrough adapted to coincide with the openings of the tray, substantially as described.

11. A tray for ballot-boxes having a series of grooves and slides therein and rows of openings extending longitudinally of said tray and between the slides and the adjacent terminations of the grooves, and means for opening and closing the said rows of openings, substantially as described.

12. In a ballot-box the combination of a box proper having a sight-opening in one end thereof, a series of compartments with registering mechanism therein having open sides adapted to be exposed to said sight-opening, and a slide for covering said sight-opening, substantially as described.

13. In a ballot-box the combination of a box proper having a series of removable compartments therein with passage-ways extending therethrough, registering mechanism in said compartments, a lid or cover for said box having a series of openings therein, a removable tray with slides and openings therein and adapted to receive ball-ballots, a slide plate on the under side of said tray and lever mechanism adapted to operate said slide-plate to release the ball-ballots and permit them to pass through the compartments, substantially as described.

In testimony whereof I have signed this specification in the presence of two subscribing witnesses.

HENRY H. NIEBUR.

Witnesses:
CHAS. S. HYER,
BERNICE A. WOOD.